Dec. 22, 1959 TUNG CHANG CHEN 2,918,663

MAGNETIC DEVICE

Original Filed Oct. 2, 1953

INVENTOR.
TUNG CHANG CHEN

BY Fidler, Beardsley & Bradley

ATTORNEY

United States Patent Office 2,918,663

Patented Dec. 22, 1959

2,918,663

MAGNETIC DEVICE

Tung Chang Chen, Villanova, Pa., assignor to Burroughs Corporation, Detroit, Mich., a coporation of Michigan Continuation of application Serial No. 383,801, October 2, 1953. This application June 10, 1959, Serial No. 819,451

29 Claims. (Cl. 340—174)

This invention relates to information storage systems and more particularly to information storage systems utilizing magnetic cores.

The present application is a continuation of my earlier filed copending application entitled "Magnetic Device," Serial No. 383,801, filed October 2, 1953, and now forfeited.

In the computing art there are many types of storage systems, including mercury delay lines, magnetostrictive devices, cathode ray devices, relay circuits, and magnetic devices. Storage systems find wide usage especially in computing systems where storage of information is of great importance if not essential to the operation of the system. Magnetic storage systems offer certain advantages over other types of storage systems, e.g., permanence of stored information in the form of remanent magnetic states over a comparatively long period of the time and without maintenance of a constant power supply and unchanging characteristics with use and age.

Some of the more recent storage devices utilizing magnetic materials comprise magnetic cores, especially, but not necessarily, magnetic cores of an annular or toroidal shape.

This invention involves the sensing of information stored in the form of remanent magnetic states of a core in a manner which does not destroy such remanent state and, hence, permits repeated sensing and use of the same information. According to one aspect of this invention, non-destructive sensing is accomplished in a toroidal core by passing electrical current through the core in a direction transverse to the direction of the remanent flux, so as to create a detectable flux change within the core without destroying its remanent state. The flux change thus produced is detected by a winding wound about the entire cross-section of the core at a point remote from the region of the transverse current flow, such winding developing an output voltage indicative of the sense of the remanent state. In one embodiment of the invention, to be discussed, the flux change within the core is produced by applying a signal to a conductor passed through two apertures in the toroidal core so as to encircle the region between the apertures. This is an improvement upon the magnetic core device shown in a co-pending application entitled "Magnetic Device," Serial No. 248,716, filed September 28, 1951 by Joseph Chedaker, George G. Hoberg and Eugene A. Sands, and assigned to the assignee of the present application. According to another aspect of the invention, non-destructive sensing is achieved by the use of just two apertures in a solid magnetic core in which the magnetic material in the region between the two apertures is set into one remanent state or the other by means of a conductor passing through one of the apertures and the state of the core is sensed by means of an interrogation winding passing through the other aperture. This core preferably takes the form of a loop of magnetic material having a single aperture passing through the magnetic material of the loop in a direction transverse to that of the remanent flux within such loop. A signal is applied to a conductor passing through this single aperture for creating a non-destructive flux change within the loop and this flux change is detected by an output winding coupled to the loop.

More specifically, one embodiment of the invention comprises a closed toroidal core of magnetic material having a pair of closely spaced apertures therethrough, such spacing being relatively close with respect to the mean circumference of the core. A first winding means is wound through these apertures which, when energized, generates magnetic flux in the core. Although the exact distribution of this flux, throughout the interval of such energization, cannot be fixed with certainty, it is believed some such flux remains localized around said apertures while a significant portion of it passes around the entire length of the core. Energizing means is provided to cause the core to become saturated with magnetic flux in one polarity so as to produce a remanent magnetic field of that polarity. A second energizing means is provided to cause the core to become saturated with magnetic flux of another polarity so as to produce a remanent magnetic field of said other polarity. A second winding means is wound around said core remote from said apertures to detect a signal output produced upon energization of the first winding means, which output is indicative of the remanent state of the core.

Another embodiment of the invention comprises a closed loop or core of magnetic material having just a single aperture therein. A first winding means is wound through the single core aperture and around the edge of said loop of magnetic material. Energization of said first winding means will cause a substantial amount of magnetic flux to be created about the entire core when such core is magnetized in one magnetic remanent state of one polarity but a significantly lesser amount of flux about such core when it is in a magnetic remanent of the opposite polarity. A first means is adapted to cause the loop of magnetic material to become saturated with magnetic flux of a first polarity to produce a first remanent state, and a second means is adapted to cause the said loop of magnetic material to become saturated with magnetic flux of a second polarity to produce a second remanent state. A second winding means is wound around said loop of magnetic material and is adapted to detect output signals produced upon energization of the first winding means.

In accordance with one feature of the invention, the said second winding means of said first embodiment of the invention has connected in series therewith a resistive means, and connected across the series combination of said second winding means and said resistive means is an asymmetrically conducting device.

In accordance with another feature, the second embodiment of the invention has a resistive means connected across the said second winding means.

These and other objects and features of the invention will be more fully understood from the following detailed description when read in conjunction with the drawings, in which.

Figure 1:
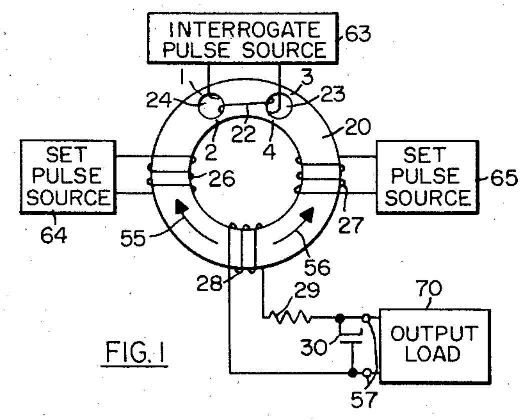
Fig. 1 is a schematic view of one embodiment of the invention.
Figure 9:
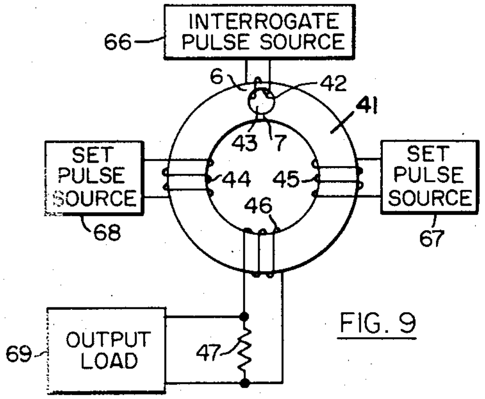
Fig. 9 is a schematic sketch of a second embodiment of the invention.
Figure 14:
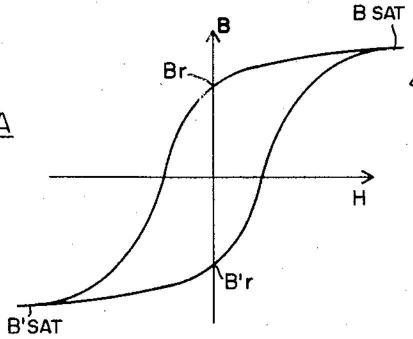
Fig. 14 shows the hysteresis loop of the core material forming the cores of Figs. 1 and 9.

Preliminary to a detailed discussion of Figs. 1 and 9, it may be well to discuss very briefly the operation of the magnetic core material used in the cores of these figures in terms of their hysteresis loop shown in Fig. 14. In this figure the various flux density conditions B of the magnetic core material are plotted against the applied magnetizing forces H which produce these conditions. After the material has been saturated repeatedly first in one direction and then in the opposite direction, it will tend to follow a curve such as that shown in Fig. 14 wherein with no applied magnetizing force ($H=O$) the core will remain at flux density condition B*r* or B*r′* depending upon the polarity of the last applied magnetizing force. These points B*r* and B*r′* are called positive and negative remanent flux density states, respectively.

If the core is at point B*r′* when a positive magnetizing force is applied, it will traverse the hysteresis loop toward positive flux saturation (B sat.), and will reach this point if the magnetizing force is sufficient. Thereafter, upon removal of this force, the core material will continue along the loop to settle at point B*r*. Likewise, if the core is at point B*r* when a negative magnetizing force of sufficient magnitude is applied, it will traverse the loop to negative flux saturation (B′ sat.) and, upon removal of this force, will settle at point B*r′*. The state of the core in these cases is said to "switch" from B*r′* to B*r* or vice versa.

On the other hand, if the core is at positive remanence B*r* when a positive magnetizing force is applied, it will merely traverse the hysteresis loop to point B sat., and upon removal of this magnetic force, return to B*r*. And, likewise if it is at negative remanence B*r′* when a negative magnetizing force is applied, it will merely travel to point B′ sat. and, upon removal of the force, return to B*r′*. The state of the core under such circumstances is often said to be "non-switchable" with respect to the applied force, since the force is not in a direction to switch the core from positive to negative remanence or vice versa.

It will be seen that the amount of flux change in the non-switchable core (i.e. B sat.—B*r* or B′ sat.—B′*r*) is small in comparison with the flux change produced when the material is in a switchable state (i.e. B sat.—B*r′* or B′ sat.—B*r*). This is especially true where the hysteresis loop of the core is rectangular, i.e., where the B*r* to B sat. ratio is relatively close to unity. Indeed for the hypothetical case of a core having perfectly rectangular hysteresis loop, where B*r* equals B sat., the flux change for a non-switchable core would be zero.

Referring now to the embodiment of the invention illustrated in Fig. 1, core 20 is of a material preferably having a substantially rectangular hysteresis loop characteristic as shown in Fig. 14, this shape of loop, while substantially rectangular, being characterized by an appreciable and readily detectable flux change between remanence and saturation. The core is provided with a pair of apertures 23 and 24 which are relatively closely spaced as shown and provide a means whereby a winding 22 may be wound therethrough. When energized by a pulse from the interrogate pulse source 63, the winding 22 will cause a magnetic flux to be formed as will be explained. A set winding 26 is wound around the core 20 and when energized by a set pulse source 64 connected across it will cause the magnetic core 20 to be driven towards clockwise or positive magnetic flux saturation so as to produce positive remanence B*r*, shown by arrow 55. A reset winding 27 is wound around the core 20 and when energized by a reset pulse source 65 connected thereacross it will cause the magnetic core 20 to be driven towards counterclockwise or negative magnetic flux saturation so as to produce negative remanence B*r′*, as shown by arrow 56. An output winding 28 is also wound on the core 20, remote from apertures 23 and 24. Connected in series with the output winding 28 is a resistance 29 and an output load 70. Diode 30 is connected across the output load 70 and performs the functions of permitting a current of one polarity only to flow through the output load 70.

In one preferred embodiment of the invention the following values and materials may be used. The magnetic core 20 may be of a ferrite material or any other magnetic material having a hysteresis characteristic shaped as shown in Fig. 14. The magnetic core has an outer diameter of .88 inch, a width of .19 inch, and a thickness of .13 inch. The apertures 23 and 24 have diameters of .06 inch and are spaced about .08 inch apart from center to center. The centers of the apertures 23 and 24 are on the mean diameter of the core. Winding 22 has 5 turns, set winding 26 has 50 turns, reset winding 27 has 50 turns, and output winding 28 has 50 turns. Resistance 29 has a value of 220 ohms. It is to be noted that other values of circuit constants and other materials, sizes, and shapes can be used in the invention to conform to particular design needs.

Referring now to Fig. 9, the magnetic loop or core 41 has a single aperture 43 therein which divides the core at that point into two separate paths 6 and 7. Winding 42 is wound through said aperture and about the edge of the core so that, when energized by interrogate pulse source 66, it will generate a magnetic flux in path 6. Set winding 44 is wound on the core 41 and has its terminals connected to set pulse source 68. Reset winding 45 is wound on core 41 and has its terminals connected to the reset pulse source 67. Also wound on the core 41 is output winding 46, the terminals of which are connected to output load 69. Resistance 47 is connected across the output load 69.

In one particular embodiment of the invention shown in Fig. 9, the following values may be used. The dimensions and material of the magnetic core 41 are the same as for core 20 of Fig. 1. The single aperture 43 has a diameter of .06 inch and the center thereof is near the mean diameter of core 41. The winding 42 has 5 turns, the set winding 44 has 50 turns, the reset winding has 50 turns, and the output winding 46 has 50 turns. The resistor 47 has a value of 220 ohms. It is to be noted that other circuit values, materials, sizes and shapes may be used in accordance with particular design needs.

Figure 2A:
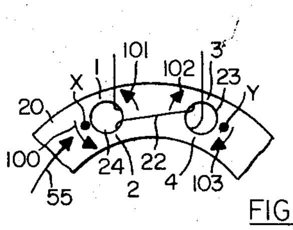
Fig. 2A illustrates a portion of Fig. 1 to show the magnetic flux distribution which is believed to be produced in core 20 by the energization of the winding 22 when the core is in a clockwise or positive magnetic remanence condition.
Figure 2B:
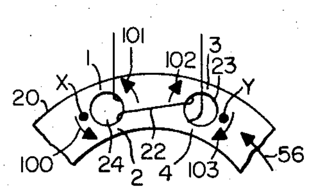
Fig. 2B shows the flux distribution thus produced when the core is in a counterclockwise or negative magnetic remanence condition.

Referring again to Fig. 1 the operation thereof will be described in detail. As noted above, energization of the set winding 26 will, upon cessation of the energizing pulse, leave the core 20 in a remanent flux condition of positive polarity, as indicated by arrow 55, while energization of the reset winding 27 will, upon cessation of the energizing pulse, leave the core 20 to acquire a remanent magnetic flux of a negative polarity, as indicated by arrow 56. By energizing winding 22 the polarity of the output pulse thereby produced in winding 28, and its amplitude when diode 30 is employed, will indicate the core remanent state. This can be seen from Figs. 2A and 2B, considered in connection with Figs. 3 to 8. In Figs. 2A and 2B the paths on opposite sides of apertures 23 and 24 have, for convenience, been designated 1, 2, 3 and 4.

Consider first Fig. 2A, which illustrates core 20 being in a positive remanent state, as shown by arrow 55. Upon energization of winding 22 by an applied pulse, some flux will tend to flow locally around apertures 23 and 24, as shown by arrows 100, 101, 102 and 103. Paths 1 and 4 will present a relatively low reluctance to such flux while paths 2 and 3 will present a relatively high reluctance. The reason for this is that with core 20 in a positive remanent state paths 1 and 4 are magnetized in a direction opposite to that of the localized flux in those paths and hence are switchable while paths 2 and 3 are magnetized in the same direction as such local flux and hence are non-switchable. The non-switchable paths, as noted above, permit very little flux change therein and hence are high reluctance paths. Otherwise stated, the easy path is in a direction opposite to that of the remanent flux. Since path 1 presents a considerably lower reluctance than path 3, point X, which is marked on core 20, is at a much higher magnetomotive force level than point Y, the flux starting at winding 22 having traversed a low reluctance path 1 to reach point X while having traversed high reluctance path 3 to reach point Y. As a consequence of this difference in mmf level, a substantial amount of flux from winding 22 will pass from point X to point Y in a counterclockwise direction around the entire core to produce an output voltage on winding 28 (Fig. 1).

An alternative way of viewing the basis for the flux distribution produced by the energization of winding 22 is that a substantial amount of flux produced by winding 22 will pass through path 1, since that path is switchable, but that very little of this flux can return to winding 22 via path 2, since such path is non-switchable, hence the remainder of such flux returns via a path around the entire core 20.

The operation of Fig. 2B is similar. Here core 20 is in a negative remanent state 56. As a result, paths 2 and 3 are switchable and hence low reluctance to the flux produced by winding 22 while paths 1 and 4 non-switchable and high reluctance thereto. The M.M.F. level of point Y, therefore, will be higher than that of point X and hence a substantial amount of flux will pass clockwise around the entire core 20 to produce an output pulse in winding 28 (Fig. 1).

Figure 3:
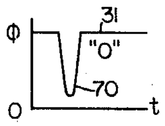
Fig. 3 shows a curve of the positive remanent magnetic flux around the toroidal loop of magnetic material of Fig. 1 which is caused by said first energizing means and the effect on this magnetic flux which is believed to be produced by said first winding means.
Figure 4:
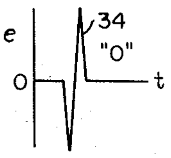
Fig. 4 shows a curve of the output of said second winding means under the positive remanent conditions shown in Fig. 3.
Figure 5:
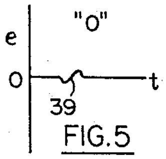
Fig. 5 shows a curve of the output of said second winding means of the structure of Fig. 1 under the conditions of Fig. 3 when an asymmetrically conducting device is connected across the terminals of said second winding means.

Fig. 3 shows a plot of the magnetic flux in the core 20 versus time when the core is in a positive remanent flux condition, as in Fig. 2A, and a pulse is applied to the winding 22. The dip 70 appearing in the curve 31 of Fig. 3 shows the flux which would be produced by winding 22 if diode 30 were not present, which flux, as noted, passes counterclockwise about core 20 in a direction opposite to that of the positive remanent flux. Fig. 4 shows the voltage which would be generated at the terminal 57 of the output winding 28 if diode 30 were not present. Fig. 5 shows the output voltage appearing across the terminals 57 when the diode is present, as is shown under the actual circuit conditions of Fig. 1. Fig. 5 shows that when the core 20 has a positive remanent flux condition, as in Fig. 2A, and a pulse is caused to be passed through winding 22, the loading of the resistance 29 and the asymmetrical device 30 prevents any substantial change of magnetic flux in the core in the direction to reduce the level of the residual flux $\phi$ (Fig. 3) and therefore there is no reverse change caused by the flux returning to this level. The output signal, as is shown in Fig. 5, is small as a result of this limiting of the flux change and also because the negative voltage induced in winding 28 will be shorted out by the low forward impedance of the asymmetrical device 30.

Figure 6:
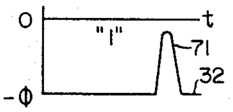
Fig. 6 shows a curve of the negative remanent magnetic flux around the said toroidal loop of magnetic material caused by said second energizing means and the effect on this magnetic flux which is believed to be produced by said first winding means.
Figure 7:
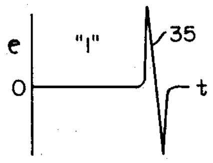
Fig. 7 shows a curve of the output of said second winding means under the negative remanent conditions shown in Fig. 6.
Figure 8:
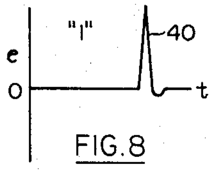
Fig. 8 shows a curve of the output of said second winding means of the structure of Fig. 1 under the conditions of Fig. 6 when an asymmetrically conducting device is connected across the terminals of said second winding means of said first embodiment.

Fig. 6 shows a plot of the magnetic flux in the core 20 versus time when the core has a negative remanent flux condition, as in Fig. 2B, and a pulse is applied to the winding 22. The rise 71 in curve 32 shows the flux produced by winding 22 which passes clockwise around the core in a direction opposite to that of the negative remanent flux. Fig. 7 shows the output voltage induced across the output terminals 57 of output winding 28 by such flux, assuming the diode 30 not to be present. Fig. 8 shows the voltage thus induced across the output terminals 57 when the diode is present, as is shown under the actual circuit conditions of Fig. 1. The diode 30 and the resistor 29 act as a load on the core 20 when the magnetic flux is changed in one direction, but have practically no effect when the magnetic flux changes in the opposite direction. This is shown in Fig. 8. The output signals shown in Figs. 4 and 7, which are distinguishable on a phase or polarity basis, have thus been rendered distinguishable from each other on an amplitude basis, as shown by Figs. 5 and 8, by means of the asymmetrical device 30 which will permit current to flow therethrough in one direction only.

Referring now to Fig. 9, the operation of the circuit shown therein will be described in detail. A pulse of current may be impressed upon either the terminals of the set winding 44 to cause the magnetic core 41 to become positively saturated with magnetic flux or upon the terminals of the reset winding 45 to cause the magnetic core 41 to become negatively saturated with magnetic flux. After cessation of the pulse the core 41 is left in a positive or negative remanent condition. If the interrogation winding 42 is then pulsed, the presence or absence of a pulse on winding 46 will be indicative of the core remanent state.

Figure 10:
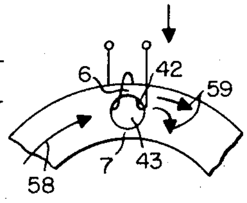
Fig. 10 is an illustration of a portion of Fig. 9 to show the magnetic flux distribution believed to be produced in core 41 by the energization of winding 42 when the coil is in a positive remanent flux condition.

In Fig. 10, in which a portion of core 41 of Fig. 9 is shown, the remanent state of the core is positive, as shown by arrow 58. When winding 42 of this figure is energized a flux is produced in path 6 of the core which tends to flow in the direction of arrows 59. It can be seen that the magnetic flux thus generated will have a large reluctance presented thereto by the path extending around the entire magnetic core 41 but will have a comparatively low reluctance presented thereto by path 7 adjacent aperture 43. The difference in the reluctance of these paths is the result of two factors: firstly, the path around the entire core is longer than path 7 and, secondly, such path is non-switchable while path 7 is switchable. Path 7 thus forms a magnetic shunt for flux produced in path 6 by winding 42 so as to shunt such flux away from the path around the entire core.

Figure 13:
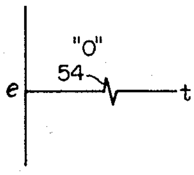
Fig. 13 shows the output from the output winding of Fig. 9 for the negative remanent condition.

Consequently, most of the magnetic flux generated by the winding 42 flows immediately around the aperture 43. Moreover, the total amount of flux generated by winding 42 will be small since path 6 is non-switchable. (No flux at all will be generated if the hysteresis loop of the core is prefectly rectangular.) The net effect of these factors is that very little flux change will occur around the entire core and hence very little voltage will be produced in winding 46 of Fig. 9, as is shown in Fig. 13.

Figure 11:
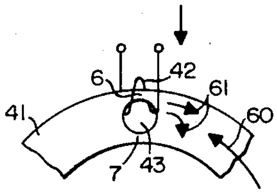
Fig. 11 is an illustration of the same portion of Fig. 9 to show the flux distribution upon energization of winding 42 when the core is in a negative remanent flux condition.
Figure 12:
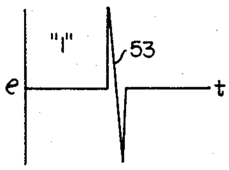
Fig. 12 shows the output from the output winding means of Fig. 9 for the positive remanent condition.

If, on the other hand, the remanent state of the core were negative, as shown by arrow 60 of Fig. 11, the magnetic flux generated by the winding 42 will have a relatively low reluctance presented to it by the magnetic path extending around the entire loop 41, since this path is now switchable, while path 7 will have a relatively high reluctance, since this path is now non-switchable. Consequently, most of the flux produced by winding 42 will pass around the entire core. Moreover, the total amount of flux generated by this winding will be relatively large since path 6 is switchable. Because of these factors, there will be a very appreciable flux change about the entire magnetic loop 41. This change in flux will be detected by the output winding 46 (of Fig. 9) and will induce a very appreciable voltage in that winding, as is shown in Fig. 12.

While an explanation has now been given of the flux distribution upon energization of windings 22 and 42 in the cores of Figs. 1 and 9, which cores are shown merely as illustrative embodiments of the present invention, this explanation is intended merely as an aid in the understanding of the operation of these cores. While this explanation is based upon extensive tests made to determine the exact mode of operation, it is far easier to ascertain the flux distribution before and after energization of windings 22 and 42 on these cores, while the cores are in a remanent flux state, than to fix the precise distribution for the changing flux state during energization of these windings, and, therefore, the precise distribution of this changing flux has not been ascertained with any real degree of certainty. Nevertheless, it is certain that energization of windings 22 and 42 of these cores produces the described output voltages which are indicative of the core remanent state. This being so, shortcomings in the theoretical explanation, if there be any, will not detract from the advantages of the present invention.

It is to be noted that the embodiments of the invention herein shown and described are but preferred embodiments of the same and that various changes may be made in materials, uses, sizes, circuit constants and circuit arrangements without departing from the spirit or scope of the invention.

What I claim is:

1. A magnetic storage device comprising a closed loop of magnetic material capable of assuming either of two magnetic remanent storage states, said loop of magnetic material having a first aperture therethrough and a second aperture therethrough spaced relatively close together with respect to the size of said loop of magnetic material, first winding means wound through said first and second apertures for producing a magnetic flux change in said closed loop of magnetic material indicative of the storage state thereof, a second winding means wound around said closed loop of magnetic material for placing said magnetic material in one of its remanent storage states, a third winding means wound around said loop of magnetic material for placing said magnetic material in the other of its remanent storage states, and a fourth winding means responsive to the magnetic flux change produced by said first winding means wound around said loop of magnetic material, a resistance connected in series with said fourth winding means, and an asymmetrically conducting device connected across said series combination of said fourth winding means and said resistance, and load means connected across said asymmetrically conducting device.

2. A magnetic storage device comprising a closed loop of magnetic material capable of assuming either of two magnetic remanent storage states, said loop of magnetic material having a first aperture therein and a second aperture therein, a first means to cause substantial magnetic saturation of said loop of magnetic material in a first polarity to produce one of said remanent storage states, a second means to cause substantial magnetic saturation of said closed loop in a second polarity to produce the other of said remanent storage states, a first winding means wound through said first and second apertures for creating a magnetic flux change in said closed loop indicative of the remanent storage state thereof, a second winding means responsive to the flux change produced by said first winding means wound around said loop of magnetic material for producing an output voltage indicative of the remanent storage state of said loop, a resistance means connected in series with said second winding means, and a diode means connected across said series combination of said second winding means and said resistance.

3. A magnetic storage device in accordance with claim 2 further including means for energizing said first winding means to substantially increase the magnetic reluctance to any magnetic flux flowing around the said loop of magnetic material when said first winding is energized, in which said first means comprises a third winding wound on said loop of magnetic material, and in which said second means comprises a fourth winding means wound on said loop of magnetic material.

4. A magnetic storage device comprising a closed loop of magnetic material capable of assuming either of two magnetic remanent storage states, a first aperture through said loop of magnetic material, a second aperture through said loop of magnetic material, a first winding means wound through said first and second apertures for producing a magnetic flux change in said closed loop indicative of the storage state of said loop, said first and second apertures and said first winding means being adapted to substantially increase the reluctance to any magnetic flux flowing around the said loop of magnetic material, a first means to cause said loop of magnetic material to become saturated with magnetic flux of a first polarity to produce one of said remanent storage states, a second means to cause said loop of magnetic material to become saturated with magnetic flux of a second polarity to produce the other of said remanent storage states, and a second winding means responsive to the magnetic flux change produced by said first winding means wound on said loop of magnetic material, a resistive means connected in series with said second winding, and a diode means connected across the series combination of said second winding means and said resistance.

5. A magnetic storage device comprising a closed loop of magnetic material capable of assuming either of two magnetic remanent storage states, said loop of magnetic material having an aperture therein, a first winding means wound through said aperture and around at least one edge of said loop of magnetic material for producing in said loop a magnetic flux change indicative of the storage state of said loop, a first means adapted to cause said loop of magnetic material to become saturated in a first polarity to produce one of said remanent storage states, a second means adapted to cause said loop of magnetic material to become saturated in a second polarity to produce the other of said remanent storage states, a second winding means responsive to the magnetic flux change produced by said first winding means wound on said loop of magnetic material, and a resistive means connected in series with said second winding means.

6. A magnetic storage device in accordance with claim 5 comprising a first energizing source adapted to energize said first winding means, in which said first means comprises a third winding wound around said core, and a second energizing means to energize said third winding, in which said second means comprises a fourth winding wound around said core, and a third energizing means to energize said fourth winding.

7. A magnetic storage device comprising an annularly shaped core of magnetizable material and capable of assuming stable remanent magnetic states, a first means for creating a magnetic flux completely around the core in one direction of polarity, a second means for creating a magnetic flux completely around the core in the opposite direction of polarity, said core having a single aperture only through a portion of the core between the inner and outer radial dimensions thereof, a winding extending through said aperture and encircling a part of the core so that when energized the magnetic field created thereby will aid the magnetic flux created by said first means, and will oppose the magnetic flux created by said second means.

8. A magnetic storage device comprising a closed continuous toroidal core of magnetic material capable of assuming either of two magnetic remanent storage states and providing a main magnetic flux path along a first portion of its length, said core having at least one aperture through its magnetic material along a second portion of its length for providing two separate branch paths along said second portion, one on each side of said at least one aperture, magnetizing means including an input winding positioned in electromagnetic coupling arrangement to said core for magnetizing said core in one or the other of said remanent storage states, an interrogating winding passing through said at least one aperture for creating a change in magnetic flux in said core indicative of the magnetic storage state of the core, and an output winding positioned about said first portion of the core for detecting flux changes in said first portion produced by said interrogating winding.

9. A magnetic storage device comprising a toroidal core of magnetic material capable of assuming a first remanent storage state of magnetic flux polarization in one sense about said core and a second remanent storage state of magnetic flux polarization in the opposite sense about said core, said core having at least one aperture through its magnetic material in a direction transverse to said flux polarization senses, magnetizing means including an input winding positioned in electromagnetic coupling relation to said core for magnetizing said core in either said one sense or said opposite sense to produce said first or second remanent storage states, interrogating means for determining the state of said core including a winding passing through said at least one aperture for creating in said core a magnetic flux the major portion of which passes around the entire core body in said one sense only when the core is in its second remanent storage state of magnetic polarization in the opposite sense, and an output winding coupled to said core for detecting said magnetic flux to produce an output voltage indicative of the core storage state.

10. A magnetic storage device as called for in claim 9 wherein said core has a pair of apertures through its magnetic material through which the interrogating winding passes.

11. A magnetic storage device comprising an annularly shaped core of magnetic material capable of assuming either of two storage states of magnetic remanence, said annular core having at least one aperture through its magnetic material in a direction transverse to the directions of flux in said two remanent storage states, magnetizing means including an input winding positioned in electromagnetic coupling relation to said core for magnetizing said core in one or the other of its remanent storage states, an interrogating winding passing through said at least one aperture for producing an interrogating flux change in said annular core indicative of the storage state of said core, and an output winding positioned about a non-apertured portion of said core for detecting flux changes therein caused by said interrogating winding.

12. A magnetic storage device as called for in claim 11 wherein said annular core has a pair of apertures through its magnetic material through which the interrogating winding passes and which further includes an asymmetrical conducting device connected to at least one terminal of the output winding.

13. A magnetic storage device as called for in claim 11 wherein said at least one aperture extends entirely through said core body in a direction substantially parallel to the axis of said annularly shaped core.

14. A magnetic storage device comprising an annularly shaped core of magnetic material capable of assuming a first and second storage state of magnetic remanence, said core having but a single aperture through its magnetic material in a direction transverse to the directions of flux in said first and second remanent storage states, magnetizing means including at least one input winding positioned in electromagnetic coupling relation to said core for magnetizing said core in one or the other of said remanent storage states, an interrogating winding passing through said single aperture for creating a change in flux in said core indicative of the storage state thereof, and an output winding positioned about a non-apertured portion of said core for detecting the flux change therein caused by said interrogating winding.

15. A magnetic storage device comprising an annularly shaped core of magnetizable material capable of assuming magnetic remanent storage states of opposite polarities, a first means for creating a magnetic flux completely around the core in one polarity or completely around the core in the opposite polarity for establishing in the core said magnetic remanent storage states, said core having a single aperture only through a portion of the core between the inner and outer radial dimensions thereof, a winding extending through said aperture for creating, when energized, a magnetic flux in said core which passes around the entire core body in one polarity only when the core is in its remanent storage state of opposite polarity.

16. A magnetic storage device comprising an annularly shaped core of magnetizable material capable of assuming magnetic remanent storage states of opposite polarities, a first means for creating a magnetic flux completely around the core in one polarity or completely around the core in the opposite polarity for establishing in the core said magnetic remanent storage states, said core having an aperture through a portion of the core between the inner and outer radial dimensions thereof, a winding extending through said aperture for creating, when energized, a magnetic flux in said core which passes around the entire core body in one polarity only when the core is in its remanent storage state of opposite polarity, and winding means positioned about a non-apertured portion of said core for detecting flux changes about the entire core body.

17. A magnetic device comprising a closed toroidal core of magnetic material capable of assuming first and second remanent flux states, at least one pair of apertures through said toroidal core, a plurality of windings each coupled electromagnetically to at least a portion of said core, one of said windings passing through said pair of apertures and having its axis perpendicular to the mean diameter of said core for producing flux in a localized path within said core, at least one other winding wound about the entire cross-section of the core along a non-apertured portion of its length.

18. A magnetic storage device comprising a closed annular loop of magnetic material capable of assuming magnetic remanent storage states of two polarities, a first aperture through said loop of magnetic material, a second aperture through said loop of magnetic material, means to cause said loop of magnetic material to be saturated with magnetic flux in a first or second polarity, a first winding means wound through said first and second apertures for creating, when energized, a magnetic flux in said loop which passes around the entire body of the loop in said first polarity only when said loop is in its second polarity remanent state, and a second winding means wound around a non-apertured portion of said loop of magnetic material and serving as an output for the device.

19. A magnetic storage device comprising a closed toroidal core of magnetic material capable of assuming either of two remanent flux states; a pair of apertures through said toroidal core; a plurality of winding means each coupled electromagnetically to at least a portion of said core, a first of said winding means passing through said pair of apertures and surrounding the core region between said apertures for producing therein a flux in one polarity, the other of said winding means being wound about the entire cross section of said toroidal core along the non-apertured portion of its length for producing flux encircling said entire toroidal core in one polarity or another, said encircling flux passing through the region between said pair of apertures so as to loop but one aperture of said pair; and means associated with one of said winding means for producing a signal whose polarity is dependent upon the relative polarities of the flux produced by said first and said other winding means.

20. A magnetic core storage device comprising a closed substantially toroidally shaped core of magnetic material capable of assuming either of two remanent flux states; a pair of apertures through said core on substantially the mean diameter of the core and extending generally parallel to the axis thereof; a plurality of winding means each coupled electromagnetically to at least a portion of said core, a first of said winding means passing through said pair of apertures and surrounding the core region between said apertures for producing therein a flux extending perpendicular to and intersecting the mean diameter of the core, other of said winding means being wound about the entire cross section of said toroidal core along a non-apertured portion of its length and operable to produce a magnetic flux encircling said entire core in one polarity or the other; and means connected to one of said winding means for producing a signal whose polarity is dependent upon the relative polarities of the flux produced by said first and said other winding means.

21. A magnetic storage device comprising a closed toroidal core of magnetic material capable of assuming either of two remanent flux states; an aperture through said toroidal core in a direction transverse to the directions of flux in said two remanent flux storage states; a plurality of winding means each coupled electromagnetically to at least a portion of said core, a first of said winding means passing through said aperture and about an edge of said core for producing a flux in the core region between said aperture and said edge, other of said winding means being wound about the entire cross section of said toroidal core along the non-apertured portion of its length for producing a flux of one polarity or the other encircling said entire toroidal core, said encircling flux passing through the region between said edge and said aperture in a polarity opposite to that of the flux produced by said first winding means; and means associated with one of said winding means for producing a signal indicative of the relative polarities of the flux produced by said first and said other winding means.

22. A magnetic storage device comprising an annularly shaped loop of magnetic material capable of assuming either a first or a second magnetic remanent state, said states being of opposite polarities; a first aperture through said loop of magnetic material; a second aperture through said loop of magnetic material; a first winding means wound through said first and second apertures, said first winding means in response to current flow therethrough substantially increasing the reluctance to any magnetic flux flowing around said loop of magnetic material; input current means magnetically coupled to said loop of magnetic material for causing said loop to assume one or the other of said first or second states of magnetic remanence; and a second winding means wound around a non-apertured portion of said loop of magnetic material and serving as an output for the device.

23. A magnetic device comprising a toroidal core of magnetic material capable of assuming stable remanent magnetic states, magnetizing means including a winding positioned in electromagnetic coupling arrangement to said core for magnetizing said core in alternate ones of said remanent states, said core having an aperture passing through its body transversely to the direction of the magnetic flux in said alternate remanent states, means including a conductor passing through said aperture for producing an alteration in the magnetic reluctance of a localized portion of said core, and an output winding wound about a non-apertured portion of said core and responsive to the flux change produced in said core by said reluctance alternating means for producing an output voltage indicative of the core remanent state.

24. A magnetic device according to claim 23 wherein said aperture divides the cross section of the core into two substantially equal portions.

25. A magnetic device comprising a toroidal core of magnetic material capable of assuming stable remanent magnetic states, magnetizing means including a winding positioned in electromagnetic coupling arrangement to said core for magnetizing said core in alternate ones of said remanent states, means for passing electrical current flow through the body of said core which lies between its inner and outer toroidal peripheries at a localized portion thereof and in a direction transverse to the directions of flux of said alternate remanent states, and an output winding positioned about said core at a point remote from said localized portion and responsive to the magnetic flux change produced in said core by said electrical current flow for producing an output voltage indicative of the core remanent state.

26. A magnetic device comprising a toroidal core of magnetic material capable of assuming stable remanent magnetic states, magnetizing means including a winding positioned in electromagnetic coupling arrangement to said core for magnetizing said core in alternate ones of said remanent states, conductive means extending through the body of said core which lies between its inner and outer toroidal peripheries in a direction transverse to the directions of flux of said alternate remanent states at least in a localized portion of said core for passing electrical current flow transversely through said core in said localized portion, and an output winding positioned about said core at a point remote from said localized portion of the core and responsive to the magnetic flux change produced in said core by said electrical current flow for producing an output voltage indicative of the core remanent state.

27. A magnetic device comprising a loop of magnetic material which is capable of assuming stable states of magnetic remanence, said loop having just a single aperture through the magnetic material between its inner and outer peripheral boundaries in a direction transverse to the directions of flux in said stable remanent states, magnetizing means including at least one winding positioned in electromagnetic coupling relation to said loop for magnetizing said loop in one or the other of said stable remanent states, an interrogating winding passes through said single aperture for creating a flux change in said loop indicative of the remanent state thereof, and an output winding in electromagnetic coupling relation to said loop for detecting the flux change caused therein by said interrogating winding.

28. A magnetic core device comprising a core of magnetic material which is capable of assuming stable states of magnetic remanence, such core having just two apertures therethrough and including at least a first closed magnetic path formed by the magnetic core material surrounding one of said apertures and at least a second magnetic path formed by the magnetic core material surrounding the other of said apertures, said first and second closed magnetic paths being common for a portion of their respective lengths, winding means including a conductor passing through one of said apertures for magnetizing said common portion in one direction or the other to produce a remanent flux state in said common portion in one direction or the other, interrogate winding means including a conductor passing through the other of said apertures for creating a flux change in said common portion having a magnitude dependent upon the direction of said remanent flux state in said common portion, and output circuit means including a second conductor passing through said one aperture for detecting the flux change produced by said winding means in said common portion.

29. A magnetic core device comprising a core of magnetic material which is capable of assuming stable states of magnetic remanence, such core having just two apertures therethrough and such apertures being spaced apart to form a common magnetic branch path therebetween, winding means including a conductor passing through one of said apertures for magnetizing said common branch path in one direction or the other to produce a remanent flux state in one direction or the other, interrogate winding means including a conductor passing through the other of said apertures for creating a flux change in said common branch path of a magnitude dependent upon the direction of said remanent flux state in said common branch path, and output circuit means including a second conductor passing through said one aperture for detecting said flux change produced in said common branch path by said interrogate winding means.

References Cited in the file of this patent

UNITED STATES PATENTS

| | | |
|---|---|---|
| 2,652,501 | Wilson | Sept. 15, 1953 |
| 2,673,337 | Avery | Mar. 23, 1954 |
| 2,708,219 | Carver | May 10, 1955 |
| 2,736,880 | Forrester | Feb. 28, 1956 |
| 2,741,757 | Devol et al. | Apr. 10, 1956 |

FOREIGN PATENTS

| | | |
|---|---|---|
| 881,089 | Germany | June 25, 1953 |

OTHER REFERENCES

Proceedings of Assoc. for Comp. Mach., May 1952, pp. 223–229.

Communications and Electronic, January 1953, pp. 822–830.